United States Patent Office 3,417,151
Patented Dec. 17, 1968

3,417,151
PROCESS FOR REDUCING THE 2,4-DIALKYL-PHENOL CONTENT IN THE MANUFACTURE OF MONOALKYLPHENOL
Edward F. Riener, Cinnaminson, N.J., and Thomas J. Durkin, Philadelphia, Pa., assignors to Rohm & Haas Company, Philadelphia, Pa., a corporation of Delaware
No Drawing. Continuation-in-part of application Ser. No. 142,789, Oct. 4, 1961. This application Sept. 29, 1964, Ser. No. 400,215
5 Claims. (Cl. 260—624)

ABSTRACT OF THE DISCLOSURE

Process for separating monoalkylphenol and 2,4-dialkylphenol from a mixture of the two which results from the alkylation of phenols. The separation is accomplished by adding boric acid to form a borate ester with the 2,4-dialkylphenol, then distilling off the monoalkylphenol along with some non-esterified products.

---

This is a continuation-in-part of our application Ser. No. 142,789 which was filed on October 4, 1961, now abandoned.

This invention relates to a process for the manufacture of alkylphenols, particularly monoalkylphenol, by the alkylation of phenols with olefins. It has particular reference to a method whereby monoalkylphenol and 2,4-dialkylphenol are the primary products, and to an improvement thereto whereby the proportion of monoalkylphenol which is produced is increased in comparison with the 2,4-dialkylphenol content in the end product.

The art has long known of numerous procedures for manufacturing alkylphenols from phenols and olefins, and in making such products as octyl or nonylphenols and the like has invariably found the higher boiling 2,4-dialkylphenol in the yield along with the lower boiling monoalkylphenol. In many applications the presence of a sizable quantity of the 2,4-dialkylphenol is objectionable, and it must be reduced to acceptable limits or else the product may not be very useful. One obvious way to reduce the 2,4-dialkylphenol content is to fractionally distill the material, but this requires elaborate equipment which in many plants may be prohibitive for economic reasons. Thus, a simple, relatively inexpensive way of reducing the amount of 2,4-dialkylphenol present has long been needed, and to obtain a solution to this long felt need is the principal object of the present invention.

We have found that a very satisfactory solution to the problem is to add boric acid to the crude alkylphenol product which is obtained upon alkylation of the phenol in the normal manner. The quantity of boric acid is comparatively very small, as only enough is needed to tie up a sufficient amount of the 2,4-dialkylphenol to bring the level thereof down to acceptable tolerances. Once so tied up, simple distillation will remove the monoalkylphenol and any residual phenol. The 2,4-dialkylphenol, having formed a borate ester, remains as a residue because of its high boiling nature. If desired, this residue may be hydrolized to produce a product rich in the amount of 2,4-dialkylphenol it contains.

The amount of boric acid needed will depend on the amount of 2,4-dialkylphenol present and the degree to which it is desired to lower the amount of 2,4-dialkylphenol in the end product. The more boric acid that is added, the more of the 2,4-dialkylphenol present becomes tied up. Eventually, this ability to tie up the 2,4-dialkylphenol falls off, as 100% of the dialkylphenol cannot be removed, but one can get rather close to that goal in the normal alkylphenol manufacturing processes and still not need to add enough boric acid to cause any objectionable side effects. Generally speaking, the amount of boric acid which is preferred is about 0.5 to 3.0 times the amount necessary to react quantitatively with the 2,4-dialkylphenol present.

The effectiveness of this invention can be appreciated from the following examples.

Example 1

One gram of boric acid was added to 147 grams of octylphenol (i.e. the residual product after essentially all the phenol was removed). The material was distilled in the normal fashion at 167–169° C./15 mm., pot temperature ranging from 203° to 242°. The effectiveness of the resultant separation is illustrated in the following gas chromatographic analyses. The product from this boric acid treatment is not only shown in the analyses, but it is there compared with another of the same octylphenol which had not been subjected to the boric acid treatment.

|  | Original Product | Product After Boric Acid Treatment |
|---|---|---|
| Phenol | 0.4 | 0.3 |
| p-t-Butylphenol | 0.2 | 0.2 |
| Tetra-iso-butylene | | |
| o-Octylphenol | 1.4 | 1.5 |
| p-Octylphenol | 89.3 | 94.0 |
| Unknown 1.1 | 1.2 | 1.1 |
| 2,4-dioctylphenol | 7.5 | 2.9 |

Example 2

A synthetic mixture of octylphenol and 2,4-dioctylphenol was prepared and heated with boric acid to demonstrate the method of this procedure. Nine (9) grams of boric acid were added to 383 grams of the synthetic mixture and the material was distilled by the standard procedure. The bulk of the product came over at 145–174° C./15 mm. The original and the distilled materials had the following gas chromatographic analyses:

|  | Original Product | Product After Boric Acid Treatment |
|---|---|---|
| Phenol | 0.7 | |
| p-t-Butylphenol | 0.8 | 0.7 |
| o-Octylphenol | 1.4 | 2.1 |
| p-Octylphenol | 82.1 | 91.9 |
| Unknown 1.1 | Trace | Nil |
| 2,4-dioctylphenol | 14.9 | 5.3 |

The drop of 2,4-dioctylphenol content in Example 1 from 7.5 to 2.9, and in Example 2 from 14.9 to 5.3, represents a significant improvement and makes possible a final product which is acceptable for many applications in which the starting material would have been useless. A similar improvement is obtained in the manufacture of nonylphenol, as illustrated by Example 3, where the original amount of 2,4-dinonylphenol is readily reduced to less than a 5% maximum which frequently is demanded by many users of nonylphenol.

Example 3

A sample of 400 grams of plant nonylphenol, which upon analysis proved to have 22.4% 2,4-dinonylphenol, was distilled by the standard process at a pressure of 10 mm. and the product was collected when the vapor pressure initially reached 167° C. (pot temperature 175° C.). The pot temperature was gradually raised to 275° C., and everything coming over was collected as product. The results were as follows:

| Fraction | Weight, Grams | Boiling Range/10 mm. |
|---|---|---|
| I | 4 | Up to 55° C. |
| II | 6 | 55–160° C. |
| III | 346 | 160–185° C. |
| IV | 30 | 185–215° C. |
|  | 6 | Residue. |

Five grams of boric acid were added to 400 grams of another sample of the same nonylphenol, and the material was distilled in a like manner. The results were as follows:

| Fraction | Weight, Grams | Boiling Range/10 mm. |
|---|---|---|
| I | 3 | Up to 55° C. |
| II | 5 | 55–160° C. |
| III | 315 | 160–167° C. |
|  | 73 | Residue. |

Whereas Fraction III of the untreated plant crude nonylphenol had 22.4% 2,4-dialkylphenol, upon analysis, Fraction III of the boric acid treated material had <3% of 2,4-dinonylphenol.

Example 4

Following are data from an actual plant run:

| Lot No. | Crude Nonylphenol Charge, lbs. | Boric Acid Charge, lbs. | Product Weight, lbs. |
|---|---|---|---|
| 1 | 40,200 | 192 | 62,820 |
| 2 | 36,980 | 221 | 31,720 |
| 3 | 38,000 | 228 | 29,500 |
| 4 | 40,000 | 239 | 23,375 |
| 5 | 40,000 | 239 | 53,680 |
| 6 | 40,000 | 239 | 31,600 |
| 7 | 38,000 | 228 | -------- |
|  | 273,180 | 1,586 | 232,695 |

$$\frac{232,695 \text{ lbs. Product}}{273,180 \text{ lbs. Crude}} \times 100 = 85.2\% \text{ Yield}$$

The crude nonylphenol used was analyzed and found to contain 20% 2,4-dialkylphenol. The products, upon analysis, were found to have the following percentages of dialkylphenol:

| Lot | Percent 2,4-dialkylphenol |
|---|---|
| 1 | 8.9 |
| 2 | 10.8 |
| 3 | 9.7 |
| 4 | 11.0 |
| 5 | 11.0 |
| 6 | 11.5 |
| 7 | 9.3 |

The decrease in 2,4-dialkylphenol content averaged about 50%.

We claim:

1. The process of separating a monoalkylphenol and 2,4-dialkylphenol from a mixture of the two which comprises adding to the mixture at least about 0.5 times the amount of boric acid necessary to form the borate ester with 2,4-dialkylphenol, and then distilling off the monoalkylphenol along with some non-esterified products.

2. The method of claim 1 in which the crude monoalkylphenol is mainly octylphenol.

3. The method of claim 1 in which the crude monoalkylphenol is mainly nonylphenol.

4. The method of claim 1 in which the quantity of boric acid which is added is from 0.5 to 3.0 times the amount necessary to react quantitatively with the 2,4-dialkylphenol present.

5. The method of claim 1 in which the non-distillable residue is hydrolyzed to provide a product containing most of the 2,4-dialkylphenol and a reduced amount of the monoalkylphenol which were present in the original mixture.

References Cited

UNITED STATES PATENTS

| 2,236,811 | 4/1941 | Dryer | 260—624 |
| 2,248,830 | 7/1941 | Stillson et al. | 260—624 |
| 2,353,282 | 7/1944 | Turkington et al. | 260—624 |
| 2,260,338 | 10/1941 | Prescott et al. | 260—624 |
| 2,899,470 | 8/1959 | Goldstein et al. | 260—624 |

LEON ZITVER, *Primary Examiner.*

W. B. LONE, *Assistant Examiner.*